Figure 1:
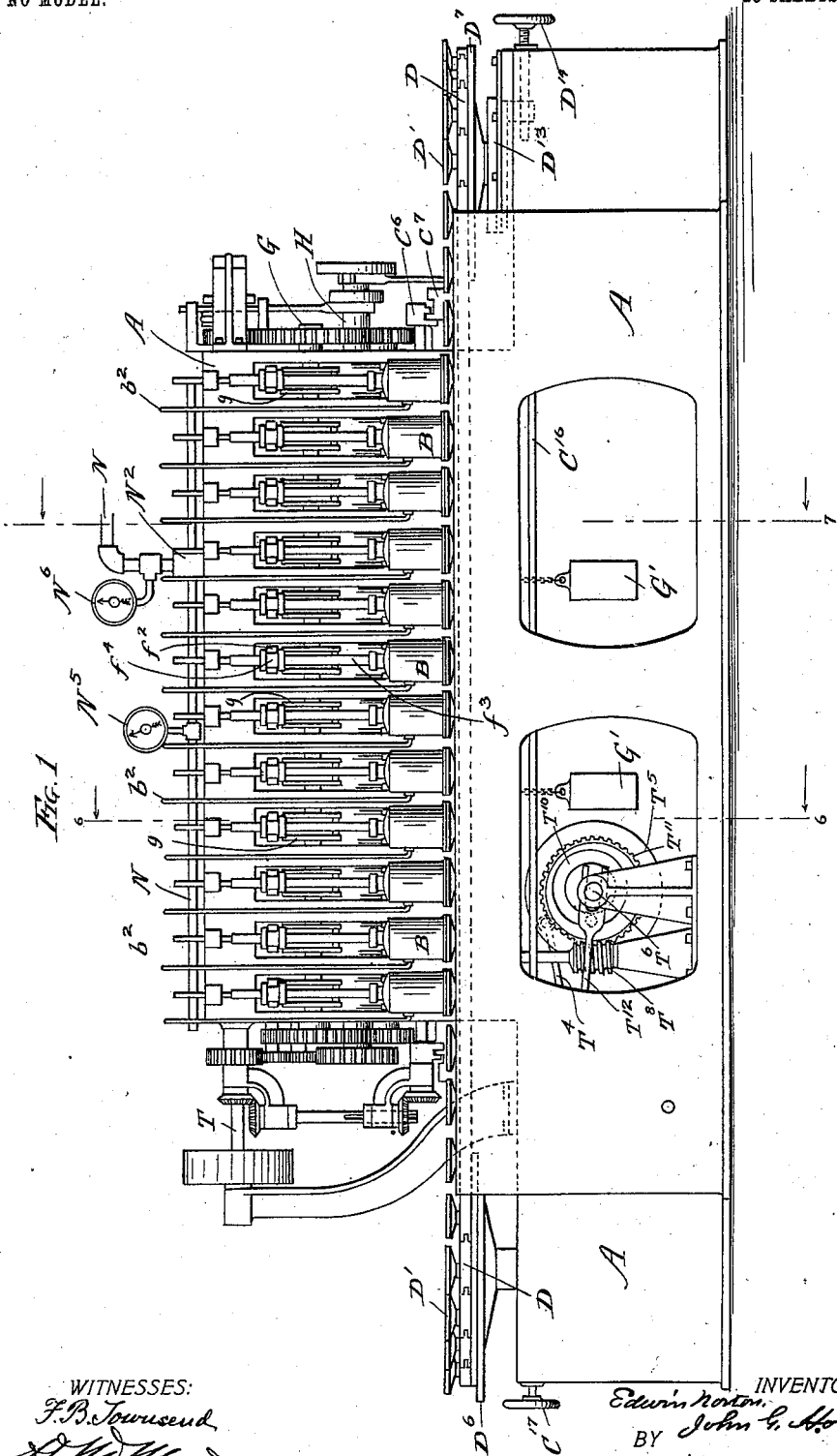

No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 1.

WITNESSES:
INVENTORS

No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 2.

WITNESSES: INVENTORS
F. B. Townsend Edwin Norton, John G. Hodgson
N. W. Munday BY
Munday, Evarts & Adcock
ATTORNEYS No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 3.

No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 6.

WITNESSES: INVENTORS.

No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 7.

WITNESSES: INVENTORS.
Edwin Norton,
John G. Hodgson.
BY
Munday, Everts & Adcock
ATTORNEYS

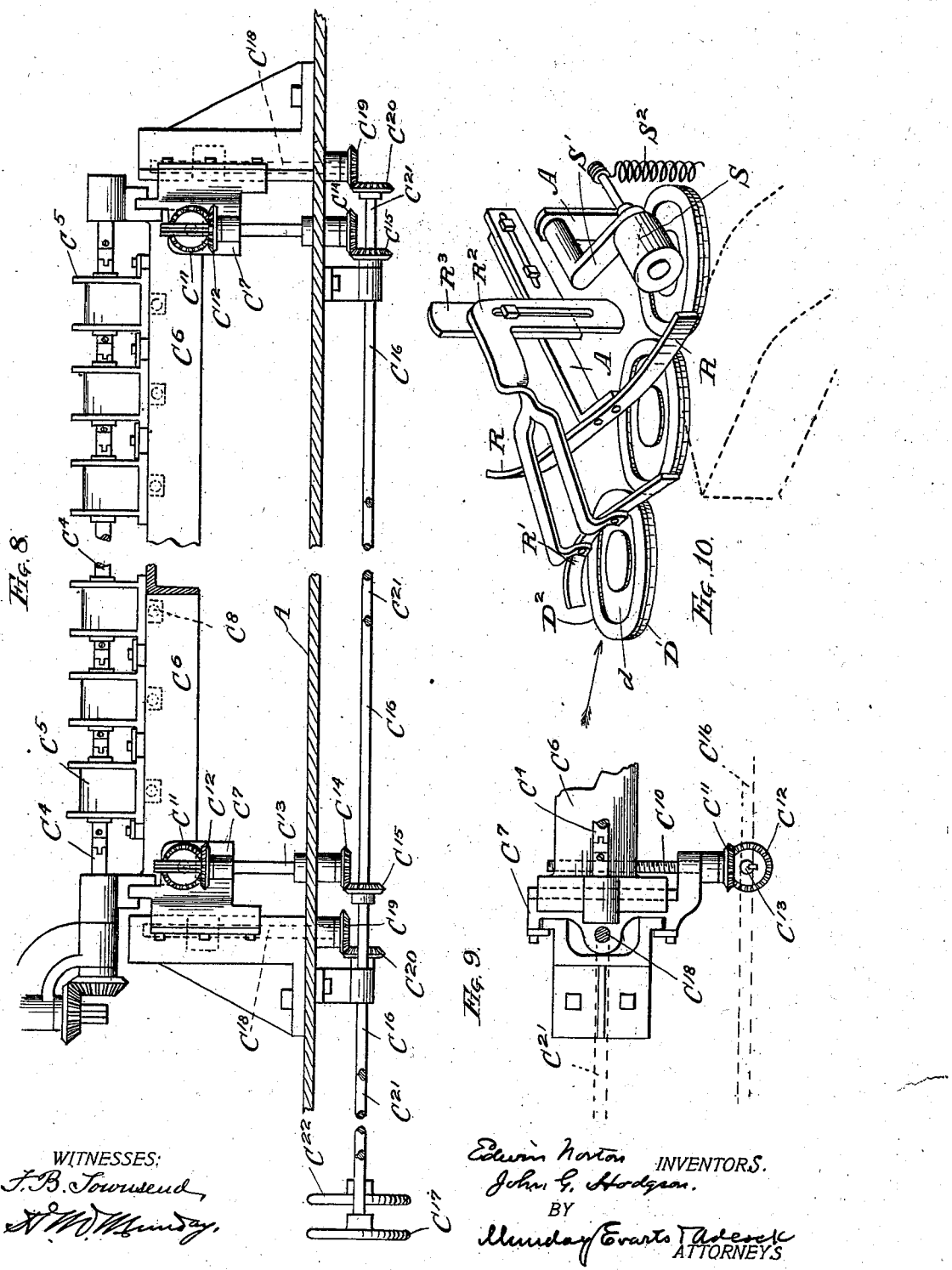

No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 9.
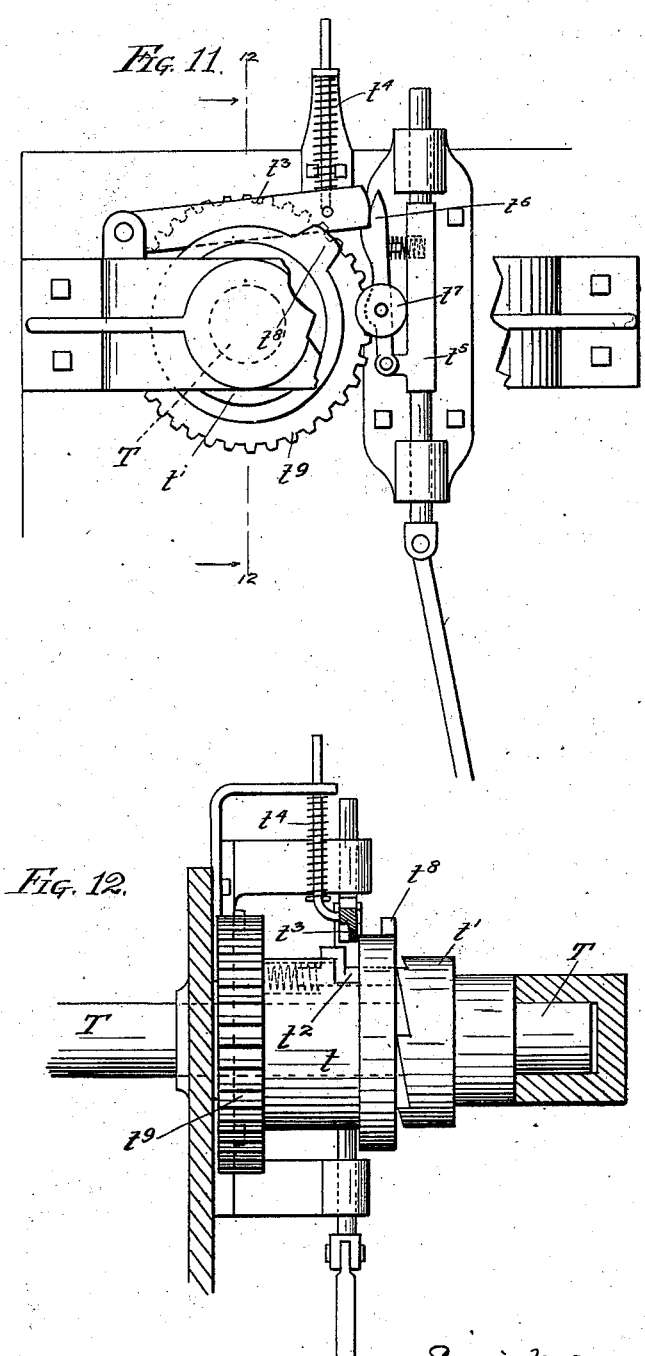
WITNESSES:
F. B. Townsend
H. M. Munday
Edwin Norton, INVENTORS.
John G. Hodgson.
BY
Munday, Evarts & Adcock
ATTORNEYS
THE NORRIS PETERS CO., PHOTO-LITHO., WASHINGTON, D. C.

No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 10.
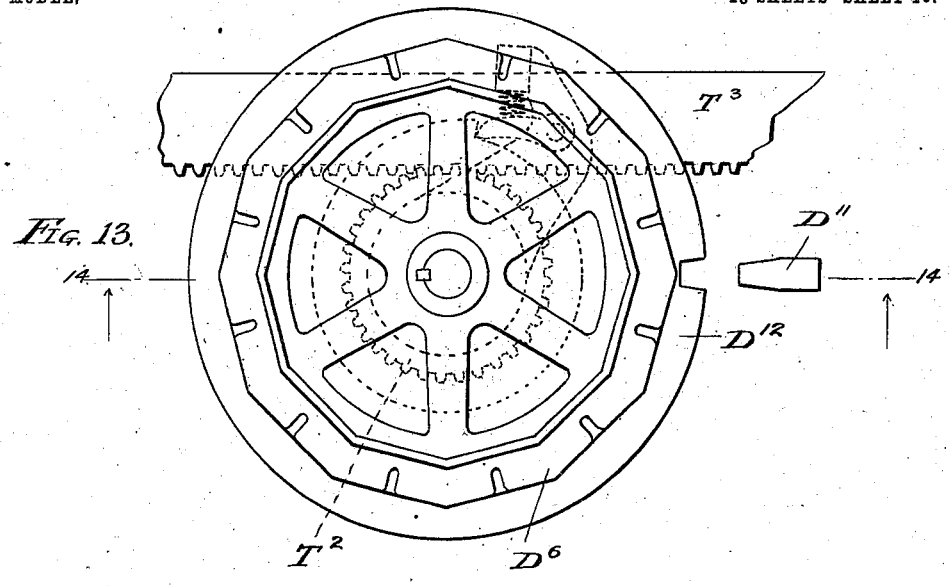
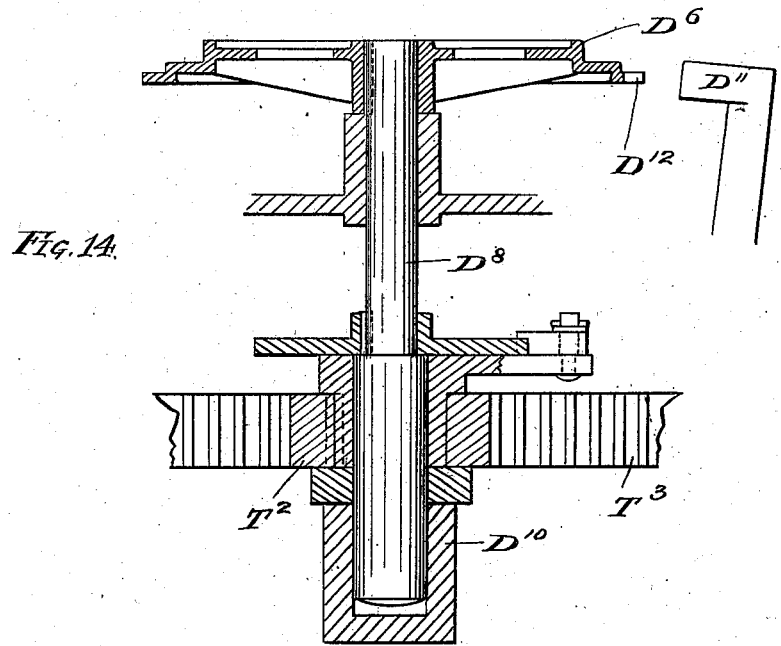

No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 11.
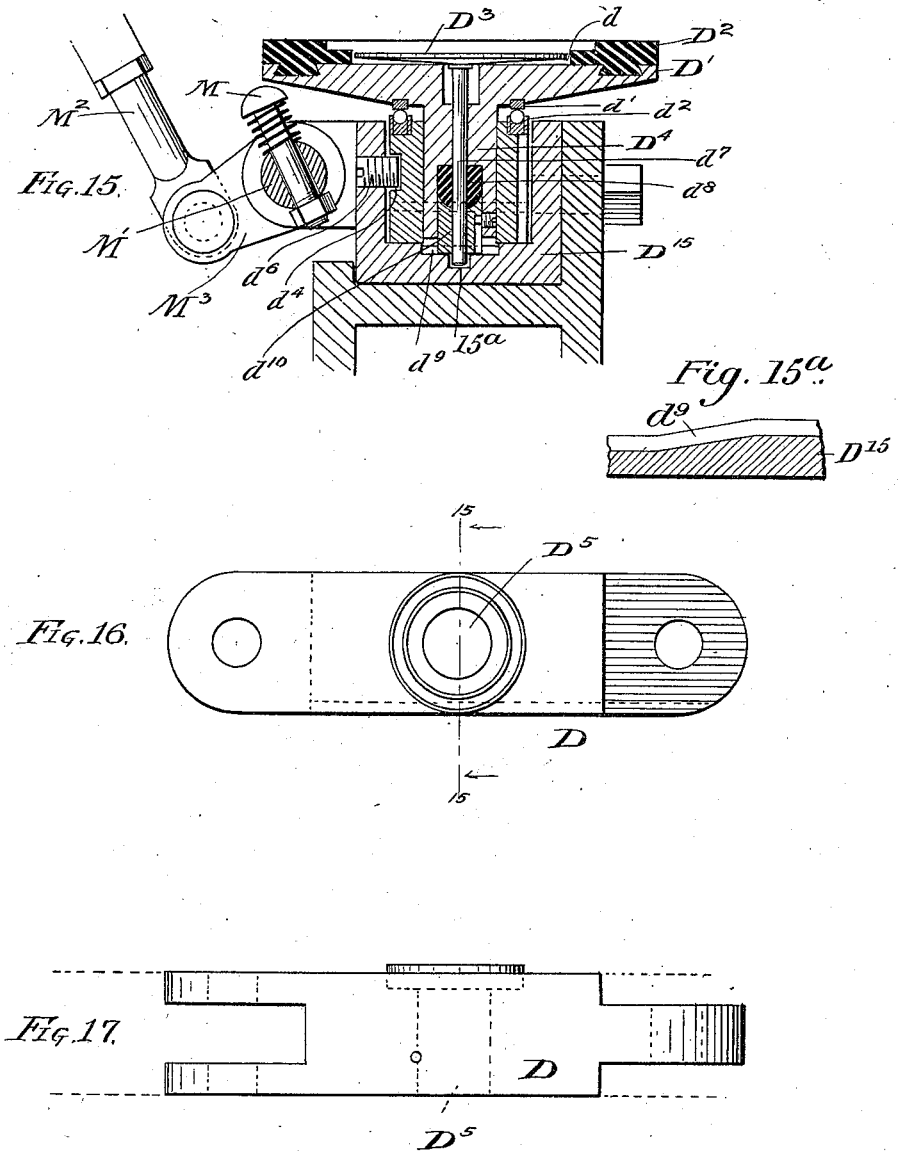
WITNESSES:
INVENTORS
Edwin Norton,
John G. Hodgson.
BY
Munday Evarts & Adcock
ATTORNEYS No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 12.
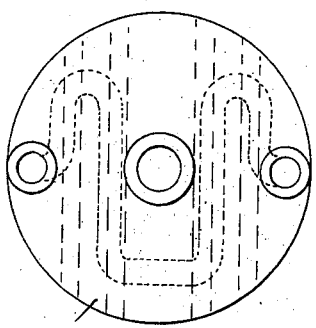
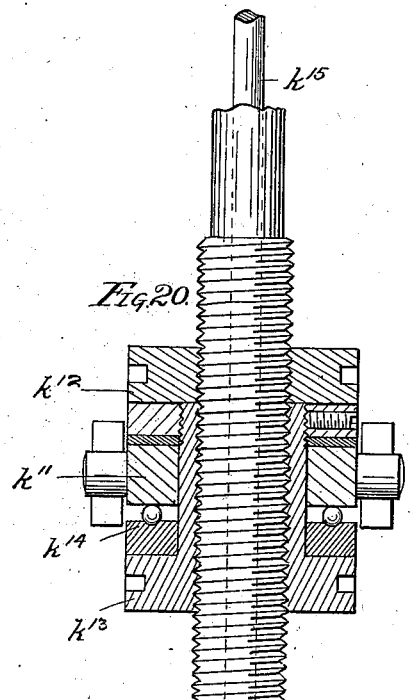
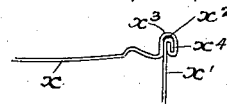
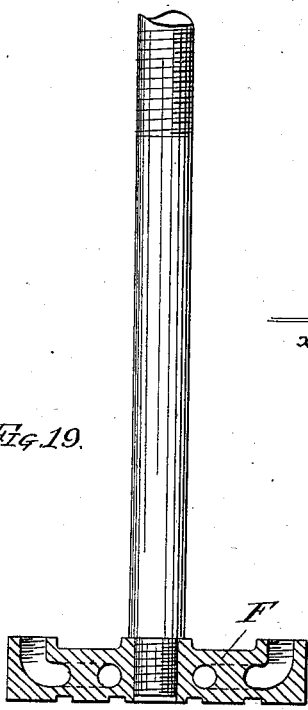
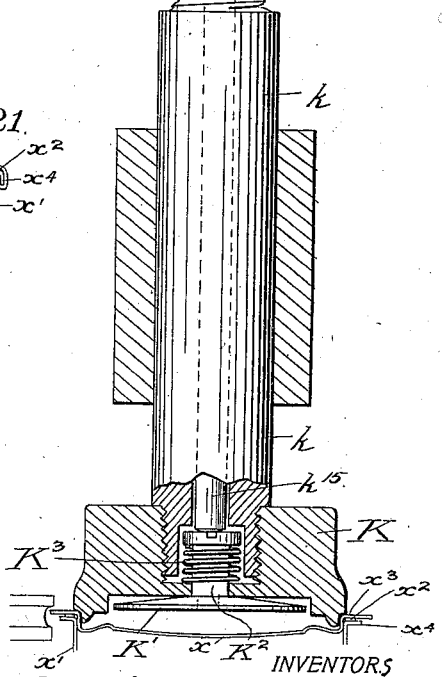
WITNESSES:
F. B. Townsend
H. W. Munday
INVENTORS
Edwin Norton
John G. Hodge
BY
Munday, Evarts & Adcock
ATTORNEYS
THE NORRIS PETERS CO., PHOTO-LITHO., WASHINGTON, D. C.

No. 727,675. PATENTED MAY 12, 1903.
E. NORTON & J. G. HODGSON.
VACUUMIZING AND DOUBLE SEAMING MACHINE.
APPLICATION FILED JULY 7, 1902.
NO MODEL. 13 SHEETS—SHEET 13.
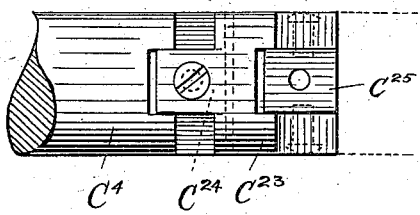
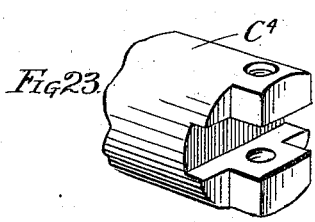
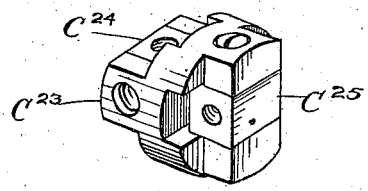
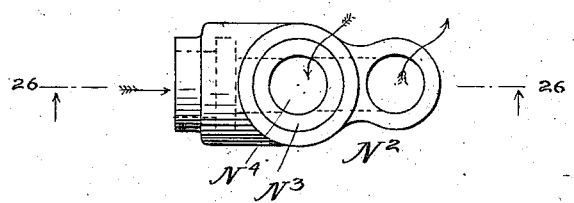
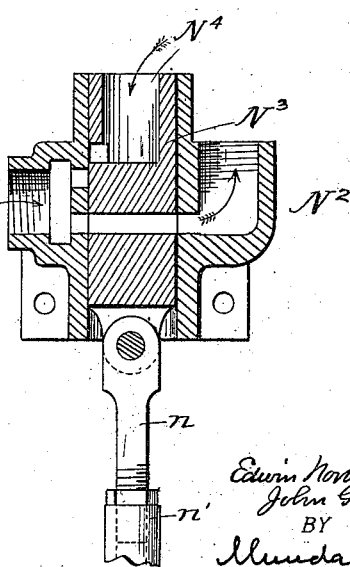

No. 727,675. Patented May 12, 1903.

UNITED STATES PATENT OFFICE.

EDWIN NORTON, OF NEW YORK, N. Y., AND JOHN G. HODGSON, OF MAYWOOD, ILLINOIS, ASSIGNORS TO AUTOMATIC VACUUM CANNING COMPANY, OF CHICAGO, ILLINOIS, A CORPORATION OF ILLINOIS.

VACUUMIZING AND DOUBLE-SEAMING MACHINE.

SPECIFICATION forming part of Letters Patent No. 727,675, dated May 12, 1903.

Application filed July 7, 1902. Serial No. 114,569. (No model.)

*To all whom it may concern:*

Be it known that we, EDWIN NORTON, residing in New York, in the county of New York and State of New York, and JOHN G. HODGSON, residing in Chicago, in the county of Cook and State of Illinois, citizens of the United States, have invented a new and useful Improvement in a Combined Vacuumizing and Double-Seaming Machine, of which the following is a specification.

This invention relates to can sealing and seaming machines.

The object of the invention is to produce a machine of a simple, efficient, and durable construction by means of which cans or vessels may be automatically, rapidly, and cheaply vacuumized, hermetically sealed, and their covers double-seamed thereon.

The invention consists in the means employed to accomplish this object or result—that is to say, it consists in the combination with a vacuum chamber or receiver to exhaust the air from the can and its contents, a seaming mechanism for seaming the cover on the can, and a carrier for conveying the cans from the receiver to the seaming mechanism.

It further consists in the combination with a series of receivers for simultaneous operation upon a plurality of cans with a series of double-seaming mechanisms for simultaneously seaming a plurality of cans, and a carrier having a series of can-holders for conveying a plurality of cans from the series of receivers to the series of seaming mechanisms.

It further consists in the novel construction of parts and devices and in the novel combinations of parts and devices herein shown or described.

The accompanying drawings, forming a part of this specification, show the preferred construction of machine embodying the invention.

In the drawings similar letters of reference indicate like parts in all the figures.

Figure 2:
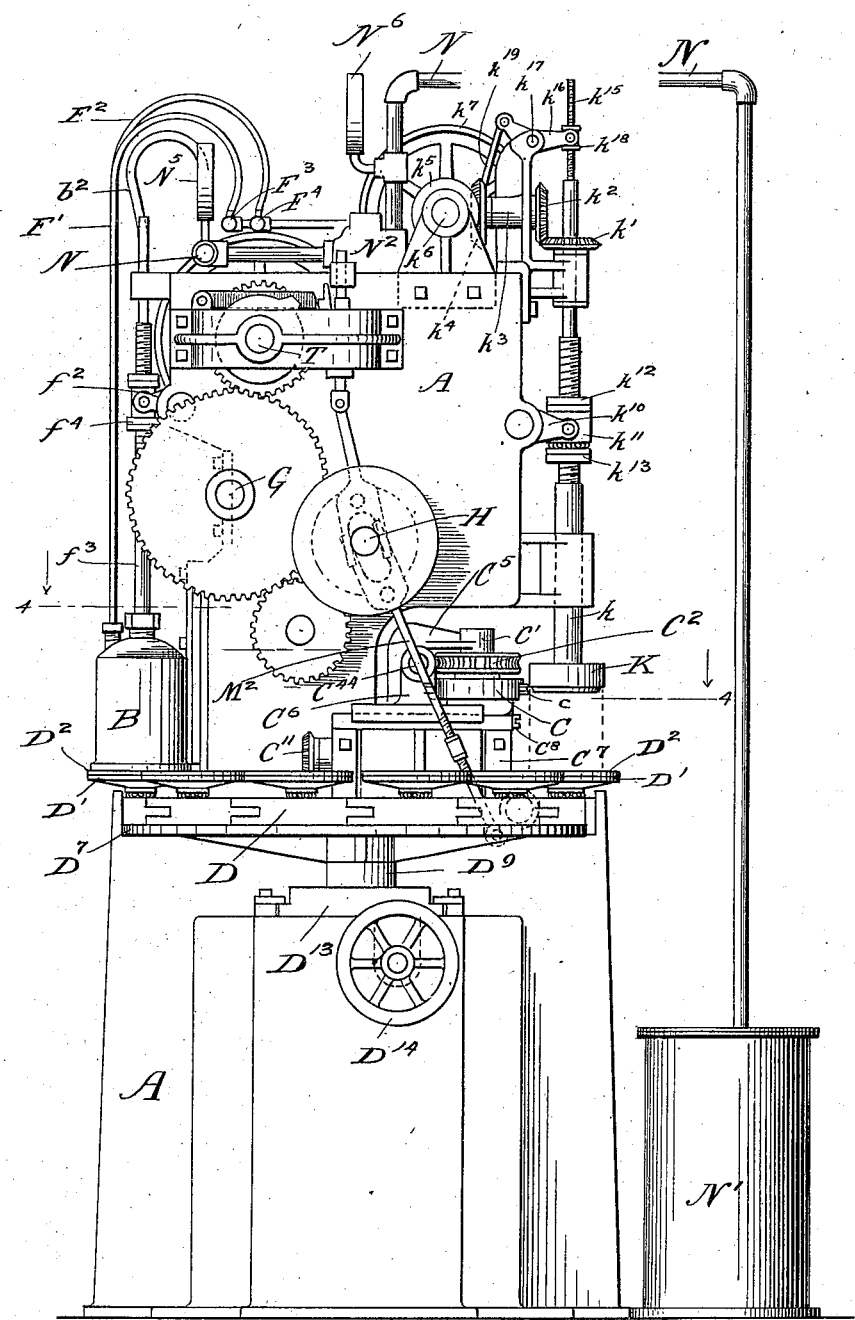
Figure 3:
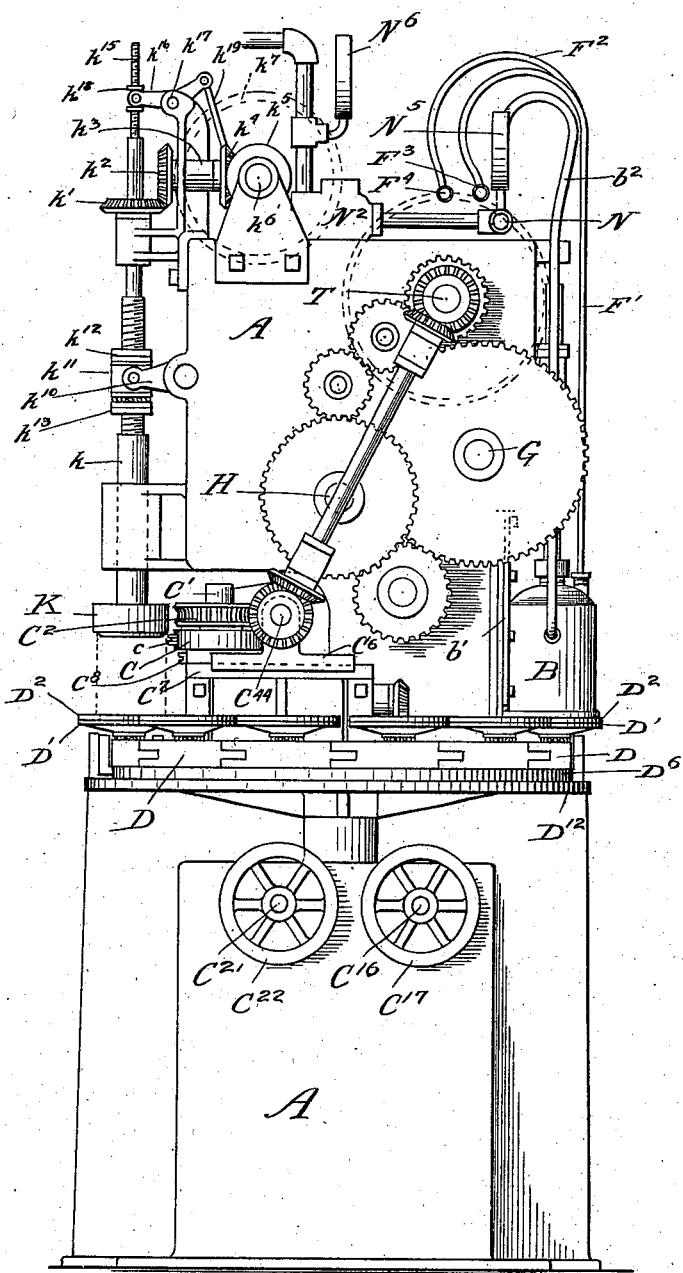
Figure 4:
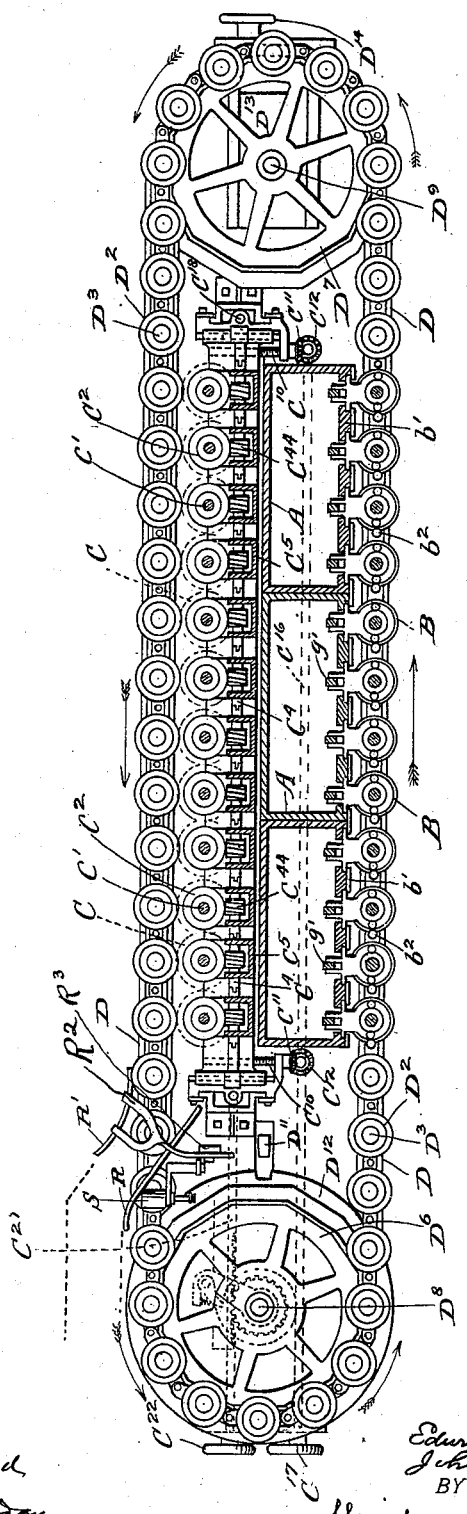
Figure 5:
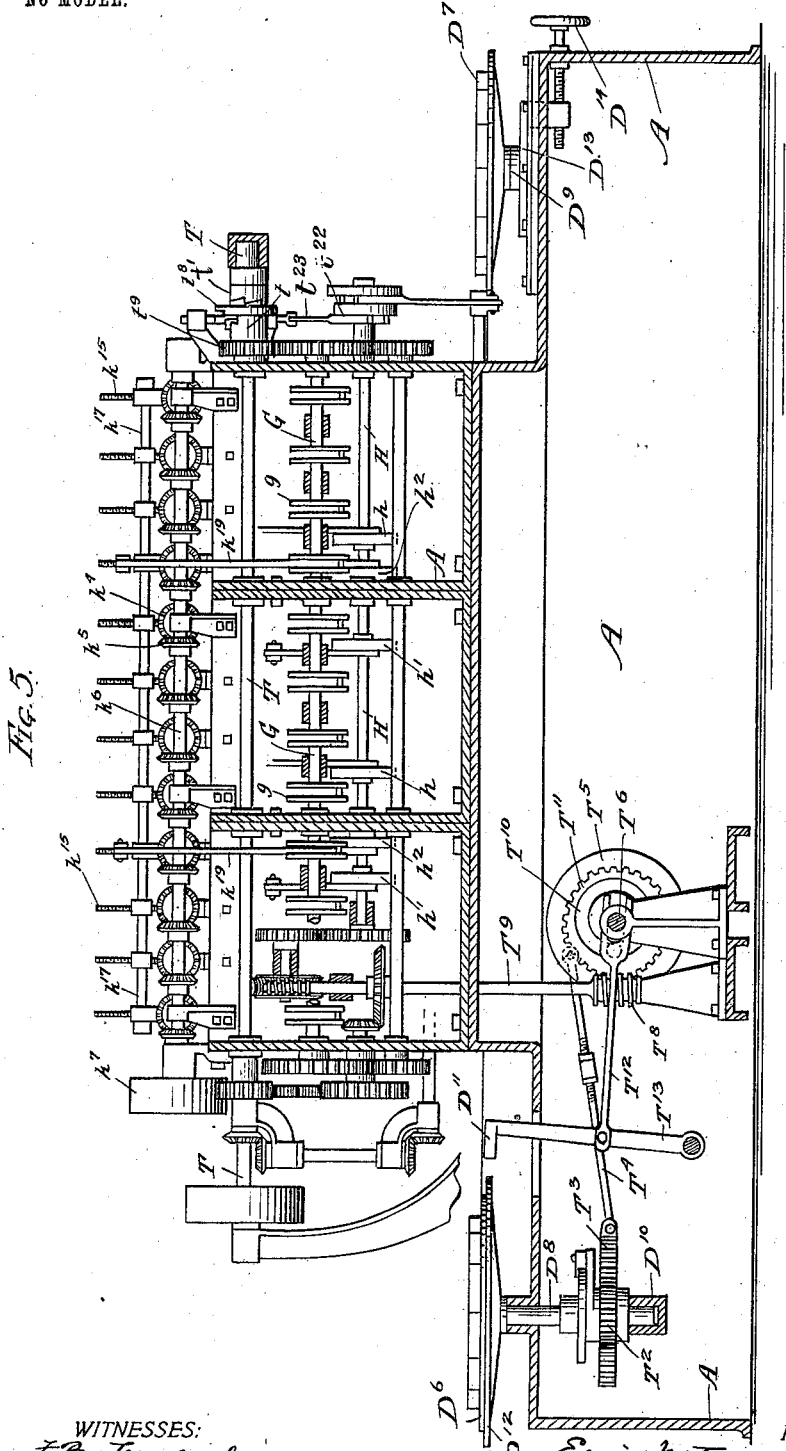
Figure 6:
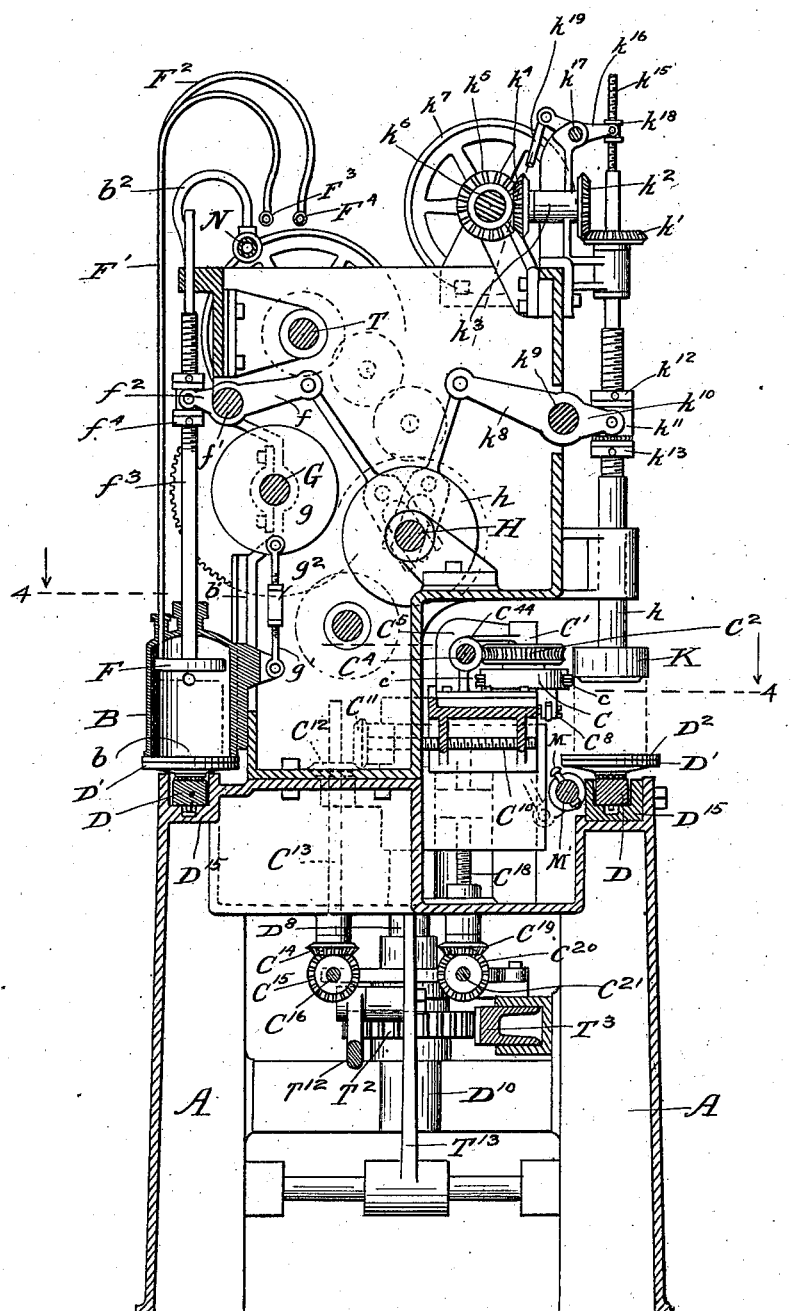
Figure 7:
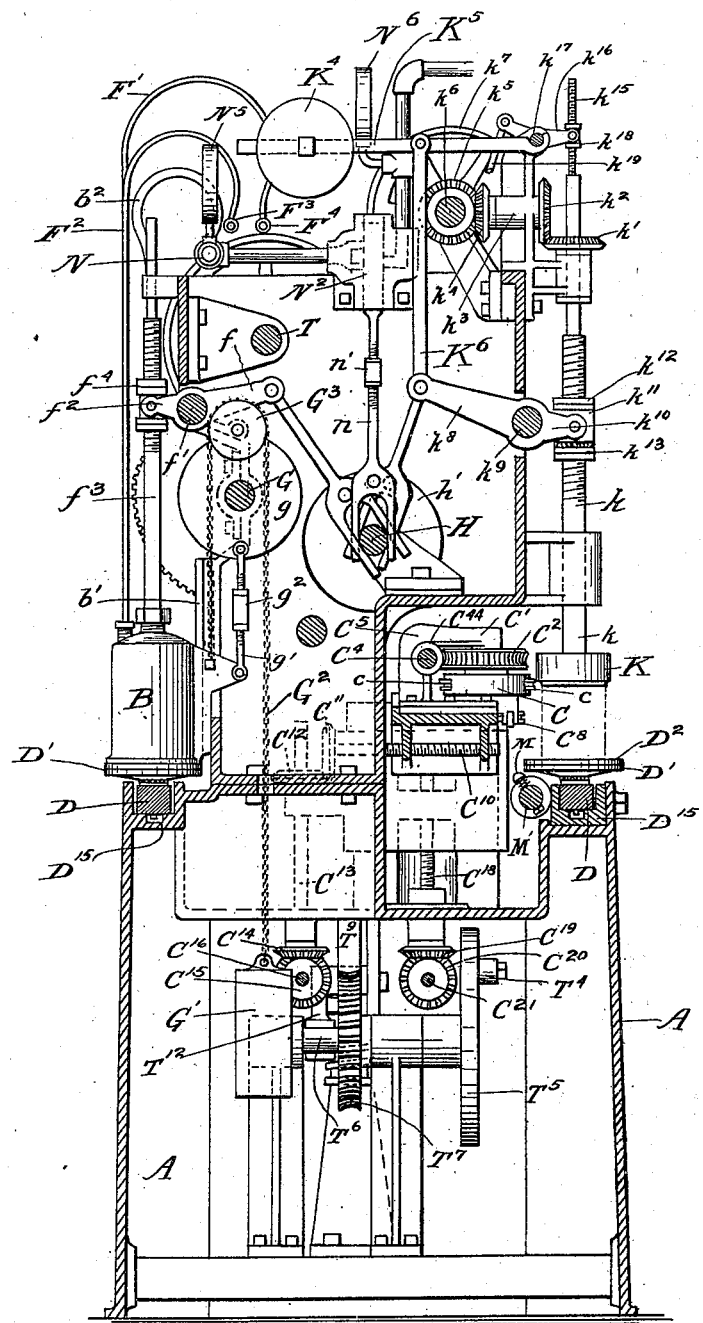

In said drawings, Figure 1 is a side elevation of the machine embodying the invention. Figs. 2 and 3 are end elevations looking from opposite ends. Fig. 4 is a sectional plan view looking from the broken line 4 4 of Fig. 2. Fig. 5 is a vertical longitudinal section. Figs. 6 and 7 are vertical cross-sections on lines 6 6 and 7 7, respectively, of Fig. 1. Fig. 8 is a view, partly in elevation, showing the vertical and horizontal adjustments of the seaming mechanism. Fig. 9 is a detail plan view of parts shown in Fig. 8. Fig. 10 is a detail perspective view showing the discharge mechanism. Fig. 11 is a detail elevation of the clutch mechanism. Fig. 12 is a section on the line 12 12 of Fig. 11. Fig. 13 is a detail plan view of the operating mechanism for the carrier. Fig. 14 is a section on line 14 14 of Fig. 13. Fig. 15 is a detail vertical cross-section through one of the links of the endless carrier. Fig 15$^a$ is a detail partial longitudinal section on line 15$^a$ of Fig. 15. Fig. 16 is a detail plan view of one of the links of the carrier. Fig. 17 is an elevation of the same. Figs. 18 and 19 are detail plan and sectional views of the steam-heated platen. Fig. 20 is a detail view, partly in section, of one of the rotary chucks. Fig. 21 is a detail view showing a portion of the can and the seam formed by the machine. Figs. 22, 23, 24 are detail views of the flexible shaft for operating the seaming-tool holders. Fig. 25 is a detail plan view of the air and exhaust valve. Fig. 26 is a section on the line 26 26 of Fig. 25.

In the drawings, A represents the frame of the machine.

B B are a series of vacuum chambers or receivers, the same being preferably bell-shaped or having open lower ends $b$ and adapted to move up and down or reciprocate vertically.

C C are a series of seaming-tool holders, each preferably provided with a set of three double-seaming tools or rollers $c$, and preferably with a plurality of such sets of double-seaming tools.

D is the can-carrier, by which the cans are conveyed successively from the series of receivers B to the series of seamers C, the same being preferably an endless flexible carrier or chain.

Each of the receivers B is furnished with an independently-reciprocating hollow platen F inside the same for evenly seating the cover $x$ on the can or vessel $x'$ and for softening the packing $x^2$, which is interposed between the seaming-flanges $x^3$ $x^4$ on the can and cover to insure the proper hermetic sealing and securing of the cover on and to the can by the vacuum or atmospheric-pressure seal, which serves to keep the can hermetically sealed and the cover in place thereon while it is being conveyed by the can-carrier from the receiver to the double-seaming machine.

The receivers B are reciprocated up and down on suitable guides $b'$ on the frame of the machine by means of the crank-disk $g$ on the receiver operating shaft G through the connecting-links $g'$, which are furnished with adjusting-turnbuckles $g^2$ to adjust the movement. To facilitate the reciprocating movement of the receivers, counterbalances $G'$ are provided, which are connected to the receivers by chains $G^2$, passing over pulleys $G^3$.

The reciprocating platens F inside the receivers are independently reciprocated as required by cams $h$ on the cam-shaft H through the connecting-link $f$ and rock-shaft $f'$, having arms $f^2$, connecting with the stems $f^3$ of the platens F by means of adjustable collars $f^4$.

The can-carrier D is furnished with a series of can holders or disks $D'$, each provided with a rubber or elastic sealing ring or pad $D^2$, by means of which the lower end of the receiver B is closed when it is moved down against the can-holder $D'$ to surround and inclose the can. Each of the can-holders $D'$ is also furnished with an ejector-disk $D^3$, which is adapted to reciprocate slightly in the holder, and thus lift the can out of the countersink $d$, with which the holder is provided, to receive and register the can with the upper chuck K while the can is being operated upon by the seaming-tools $c$ in the tool-holder C.

The can-holders $D'$ are mounted to rotate on the carrier D and are provided each with a spindle or stud $D^4$, fitting in a suitable socket or bearing $D^5$ in the carrier, ball-bearings $d'$ $d^2$ being interposed to cause the holders to rotate freely.

$D^{15}$ is a track or guide for supporting the endless flexible carrier D, the same being preferably formed integrally with the frame A on one side and in a separate piece from the frame A on the other side of the machine for convenience in casting, and $D^6$ $D^7$ are the pulleys or sprocket-wheels at the opposite ends of the machine for the endless flexible carrier, the same being secured to vertical shafts $D^8$ $D^9$. The shaft $D^8$ is journaled in suitable bearings $D^{10}$ on the frame of the machine and is intermittently rotated as required to move the carrier the distance necessary to bring a number of cans one under each of the receivers B and another set of cans in position for being operated upon by the seamers C C by any suitable connecting mechanism. The carrier is locked in position to cause the can-holders to properly register with the receivers and with the seamers by a movable lock $D^{11}$, engaging a lock wheel or disk $D^{12}$. The shaft $D^9$ of the other pulley or sprocket-wheel $D^7$ is journaled on a slide $D^{13}$, which is moved by adjusting screws $D^{14}$ as may be required to take up the slack in the carrier.

To keep the endless flexible carrier D properly seated on its track $D^{15}$, it is preferably furnished with a guide-groove $d^4$ in its links, which engage guide screws or projections $d^6$ on the guide or track $D^{15}$.

The seaming-tool holders C correspond in number to the receivers B, the machine being preferably provided with twelve of each, though the number may be varied, the receivers being located on one side of the machine and the seamers on the opposite side thereof. Twelve cans are thus vacuumized at once, while twelve other cans are being seamed.

The upper chuck-disks K, which coöperate with the rotatable can holders or disks $D'$ on the carrier D to rotate the cans while they are being operated upon by the seaming-tools or seamers, are mounted to both rotate and reciprocate and are furnished each with a can-ejector disk $K'$, the stem $K^2$ of which has a spring $K^3$ for retracting it. The hollow shafts or spindles $k$ of the rotating and reciprocating chuck-disks K are rotated as required through the bevel-gears $k'$ thereon, which mesh with bevel-gears $k^2$ on the shaft $k^3$, which have bevel-gears $k^4$ meshing with bevel-gears $k^5$ on the chuck-driving shaft $k^6$, which has a driving-pulley $k^7$. The hollow shaft $k$ of the chuck K is reciprocated as required by means of a cam $h'$ on the cam-shaft H through the connecting-link $k^8$ and rock-shaft $k^9$, having arms $k^{10}$ connecting through the adjustable collars $k^{11}$ $k^{12}$ $k^{13}$ with the hollow chuck spindle or shaft $k$, a ball-bearing $k^{14}$ being interposed to permit the chuck-spindle $k$ to revolve freely.

The operating-rod $k^{15}$ for the ejector-disk $K'$ is reciprocated as required by arms $k^{16}$ on the rock-shaft $k^{17}$ and connecting with said stem $k^{15}$ through the adjustable collars $k^{18}$, said rock-shaft being operated by a cam $h^2$ on the cam-shaft H through the connecting-link $k^{19}$.

Each of the seaming-tool holders C is preferably mounted to rotate in order to bring each seaming tool or roller $c$ $c'$ $c^2$ successively into operation against the seaming-flanges of the rotating can. The shaft $C'$ of each tool-holder is furnished with a worm-gear $C^2$, which meshes with the worm $C^{44}$ on the worm-shaft $C^4$.

The shaft $C'$ of each of the tool-holders C is mounted or journaled on an independently-adjustable slide $C^5$, carried on the laterally-adjustable bar $C^6$, secured to vertically-adjustable slides $C^7$. The independently-adjustable slides $C^5$ are each adjusted as required to bring the seaming tools or rollers on the tool-holders C with the required pressure against the seaming-flanges of the can by means of the adjusting-screws $C^8$. The laterally-adjustable bar $C^6$, carrying the slide $C^5$, is adjusted laterally as required to adapt the machine for operation upon cans of different diameters by means of the adjusting-screws $C^{10}$, furnished with bevel-gears $C^{11}$, which mesh with bevel-gears $C^{12}$, splined to the upright shaft $C^{13}$, having bevel-gears $C^{14}$ meshing with bevel-gears $C^{15}$ on the shaft $C^{16}$, having a hand-wheel $C^{17}$ for effecting this adjustment.

The bar $C^6$ is adjusted up and down as required to adapt the machine to operate upon cans of different heights by means of the adjusting-screws $C^{18}$, operating upon the slide $C^7$, and furnished with bevel-gears $C^{19}$, which mesh with bevel-gears $C^{20}$ on the shaft $C^{21}$, having hand-wheels $C^{22}$ for effecting the vertical adjustment of the seamers.

To enable the worm-shaft $C^4$ to permit of individual adjustment of the seaming-tool-holder slide $C^5$ without interfering with the proper meshing of its worm $C^{44}$ with the worm-gears $C^2$, the shaft $C^4$ is made flexible or furnished with jointed or flexible couplings $C^{23}$ $C^{24}$ $C^{25}$, the blocks $C^{24}$ and $C^{25}$ being free to move, and thus permit the necessary longitudinal and transverse movements of the separate sections or joints of the shaft.

To arrest or quickly stop the can-holders D' after the seaming operation is completed, brakes M are provided, which are adapted to engage the rotating can-holders D' and arrest their rotation. These brakes M are furnished with springs $m$ and are mounted on a rock-shaft M', operated by a cam $h$ on the cam-shaft H through the connecting-links $M^2$ and operating-arms $M^3$.

N is the air-exhaust pipe, leading to any suitable exhaust mechanism, preferably a vacuum-pump N'. Connecting with the exhaust-pipe N through the valve $N^2$ are a series of exhaust-pipes $b^2$, leading to each of the receivers, for exhausting the air therefrom. The valve-box $N^3$ has an air-inlet $N^4$, which is opened by the movement of the valve to admit air to the receivers after the covers have been seated on the cans to seal the same thereto by atmospheric pressure. The valve $N^2$ is automatically operated as required by means of a cam $h$ on the cam-shaft H through a connecting-link $n$, which is furnished with a turnbuckle $n'$ for adjusting the same.

$N^5$ is a vacuum-gage indicating the degree or extent of vacuum produced in the receivers.

Steam is admitted to the hollow platens F to heat the same as required through the steam-pipes F' $F^2$, which communicate with the main steam-supply pipes $F^3$ $F^4$.

$N^6$ is an exhaust-gage for indicating exhaust-pressure in the pressure-reservoir.

To ease the reciprocating movement of the chuck-disks K, the same are furnished with a counterbalance $K^4$, connected thereto through the lever $K^5$ and link $K^6$.

The cans are automatically discharged from the holders D' of the carrier D after being vacuumized and seamed by means of a discharge device R, secured to the frame, and preferably consisting of an inclined rail furnished with a separate guide R', the latter being secured to the vertically-adjustable bracket $R^2$, mounted on a laterally-adjustable bracket $R^3$, which carries the discharge-rail R.

To insure the reseating of the can-ejector disks $D^3$, a movable pressure-roller S is mounted in the path of the can-holders D, so as to automatically press down the ejector-disks $D^3$ as the carrier moves under the pressure-roller. This pressure-roller is mounted on a crank-arm S' and is actuated by a spring $S^2$.

The stem $d^7$ of the ejector-disk $D^3$ is actuated to raise the ejector-disk and lift the can out of the countersink $d$ in the rubber or elastic sealing-pad $D^2$ by means of an inclined or raised portion $d^9$ in the track $D^5$ of the carrier D.

To hermetically close the opening in the stem of the can-holder D', through which the stem $d^7$ of the ejector-disk $D^3$ passes at the time the can-holder coöperates with the receiver to close the lower end thereof, the block or packing $d^8$, of rubber or other elastic material, is inserted in the hollow stem of the holder D' and surrounds the stem $d^7$ of the ejector $D^3$ and is compressed by a sliding block $d^{10}$, which is operated by the inclined or raised portion $d^9$ of the track $D^5$ of the carrier D.

Motion is communicated to the driving-shaft $D^8$ of the sprocket-wheel $D^6$ through a gear $T^2$ thereon meshing with the reciprocating rack $T^3$, which is connected by a link $T^4$ with a disk $T^5$ on the shaft $T^6$, having a gear $T^{11}$ meshing with a worm $T^8$ on the shaft $T^9$. The movable lock $D^{11}$ is operated by a cam $T^{10}$ on the shaft $T^6$ through the connecting-link $T^{12}$ and lever $T^{13}$. The required intermittent motion is communicated from the driving-shaft T to the cam-shaft H and the mechanism connected thereto through any suitable clutch mechanism, the same consisting, preferably, of the clutch-disk $t$ $t'$, clutch-bolt $t^2$, latch $t^3$, spring $t^4$, slide $t^5$, pawl $t^6$, carrying-roller $t^7$, which is engaged by a tooth $t^8$ on the hub of the loose gear $t^9$. The clutch-slide $t^5$ is operated by a cam $t^{22}$ and connecting-rod $t^{23}$.

Having described the invention, what is claimed is—

1. In a can vacuumizing and seaming machine, the combination with a receiver, of a seaming mechanism and a horizontally-moving can-carrier to move the can from the receiver to the seaming mechanism, substantially as specified.

2. The combination with a can-carrier, of a plurality of receivers for simultaneously exhausting the air from a plurality of cans, and a plurality of seaming mechanisms for simultaneously seaming a plurality of cans, substantially as specified.

3. The combination with a can-carrier furnished with a plurality of can-holders, of a receiver and a movable tool-holder having a plurality of seaming tools or rollers, substantially as specified.

4. The combination with a can-carrier provided with a plurality of rotatable can-holders, of a receiver, a seaming-tool and a rotatable chuck-disk for rotating the can, substantially as specified.

5. The combination with a receiver, of a horizontally-moving can-carrier having a rotatable can-holder, a seaming-tool and a chuck-disk for rotating the can while being operated upon by the seaming-tool, substantially as specified.

6. The combination of a can-carrier having a can-holder adapted to close the lower end of a receiver, with a reciprocating receiver having an open lower end, and a seaming mechanism, substantially as specified.

7. The combination of a can-carrier having a can-holder adapted to close the lower end of a receiver, with a reciprocating receiver having an open lower end, a seaming mechanism, and a reciprocating plate within the receiver for seating the cover on the can, substantially as specified.

8. The combination of a can-carrier having a can-holder adapted to close the lower end of a receiver, with a reciprocating receiver having an open lower end, a seaming mechanism, a reciprocating plate within the receiver for seating the cover on the can, and a valve for controlling the admission of air to the can, substantially as specified.

9. The combination with a can-carrier having a plurality of rotatable can-holders furnished with elastic pads or rings for closing an open-ended receiver, of a reciprocating receiver having an open lower end and a set of double-seaming tools, substantially as specified.

10. The combination with a can-carrier having a plurality of rotatable can-holders furnished with elastic pads or rings for closing an open-ended receiver, of a reciprocating receiver having an open lower end, a set of double-seaming tools, and a rotatable chuck-disk, substantially as specified.

11. The combination with a can-carrier having a plurality of rotatable can-holders furnished with elastic pads or rings for closing an open-ended receiver, of a reciprocating receiver having an open lower end, a set of double-seaming tools, a rotatable chuck-disk, and means for automatically discharging the cans from the can-holders, substantially specified.

12. The combination with a plurality of reciprocating open-ended receivers, of a can-carrier having a plurality of rotatable can-holders, furnished with sealing pads or rings for coöperation with the receivers, a plurality of chuck-disks for rotating the cans, and a plurality of tool-holders furnished with seaming-tools, substantially as specified.

13. The combination with a plurality of reciprocating open-ended receivers, of a can-carrier having a plurality of rotatable can-holders, furnished with sealing pads or rings for coöperation with the receivers, a plurality of chuck-disks for rotating the cans, a plurality of tool-holders furnished with seaming-tools, and means for automatically discharging the cans from the can-holders, substantially as specified.

14. The combination with a plurality of reciprocating open-ended receivers, of a can-carrier having a plurality of rotatable can-holders, furnished with sealing pads or rings for coöperation with the receivers, a plurality of chuck-disks for rotating the cans and a plurality of rotary tool-holders, each furnished with a set of double-seaming tools, substantially as specified.

15. The combination with a plurality of reciprocating open-ended receivers, of a can-carrier having a plurality of rotatable can-holders, furnished with sealing pads or rings for coöperation with the receivers, a plurality of chuck-disks for rotating the cans, and a plurality of rotary tool-holders each furnished with a plurality of sets of double-seaming tools, substantially as specified.

16. The combination with a can-carrier having a plurality of can-holders, of a receiver, a rotatable chuck-disk for rotating the can, a seaming-tool and a brake for arresting the rotation of the can-holder, substantially as specified.

17. The combination with a can-carrier having a plurality of can-holders, of a receiver, a rotatable chuck-disk for rotating the can, a seaming-tool, a brake for arresting the rotation of the can-holder, and a can-discharge device, substantially as specified.

18. The combination with a can-carrier having a plurality of rotatable can-holders each furnished with a can-ejector, of a receiver, and a seaming mechanism, substantially as specified.

19. The combination with a receiver, of a can-carrier having a rotatable can-holder, a seaming-tool, and a rotating and reciprocating chuck-disk, substantially as specified.

20. The combination with a can-carrier having a plurality of rotatable can-holders furnished with ejectors, and a device in the path of the can-holders for returning the ejectors to position, substantially as specified.

21. The combination with an endless flexible can-carrier, having a series of rotatable can-holders, of a plurality of receivers, a plurality of chuck-disks, and a plurality of tool-holders having seaming-tools, substantially as specified.

22. The combination with an endless flexible can-carrier, having a plurality of can-holders, a track for the can-carrier, a receiver, and a seaming mechanism, substantially as specified.

23. In a can-vacuumizing and double-seaming machine, the combination with a receiver, of a can-carrier and a double-seaming mechanism, substantially as specified.

24. In a can-vacuumizing and double-seaming machine, the combination with a receiver, of a double-seaming mechanism, substantially as specified.

25. The combination with a receiver, of a set of double-seaming rolls, and means for chucking or clamping the cover to the can while being operated upon by the double-seaming rolls, substantially as specified.

26. The combination with a receiver, of a can-holder, a chuck-disk, and a movable tool-holder having a set of double-seaming rolls thereon, substantially as specified.

27. The combination with a receiver, of a reciprocating plate therein, a rotatable can-holder, a rotating chuck-disk, a tool-holder, and a set of double-seaming rolls, substantially as specified.

28. The combination with a can-carrier having a plurality of rotatable can-holders, of a receiver, a reciprocating steam-heated platen within the receiver and a seaming mechanism, substantially as specified.

29. The combination with a receiver, of means for exhausting the air therefrom, a can-carrier having a plurality of can-holders, and a seaming mechanism, substantially as specified.

30. The combination with a can-carrier having a plurality of can-holders, of a plurality of receivers, substantially as specified.

31. The combination with a can-carrier having a plurality of can-holders, of a plurality of receivers, means for exhausting the air from the receivers and means for admitting the air to the receivers, substantially as specified.

32. The combination with a can-carrier having a plurality of can-holders, of a plurality of open-ended reciprocating receivers coöperating with said can-holders, substantially as specified.

33. The combination with a can-carrier having a series of can-holders, of a series of open-ended reciprocating receivers, each having an independently-reciprocating plate therein, substantially as specified.

34. The combination with a can-carrier having a plurality of rotatable can-holders, of a reciprocating receiver having an open lower end, a rotating and reciprocating chuck-disk and a movable seaming-tool holder, substantially as specified.

35. The combination with a can-carrier having a plurality of rotatable can-holders, of a reciprocating receiver having an open lower end, a rotating and reciprocating chuck-disk, and a movable seaming-tool holder having a set of double-seaming tools or rollers thereon, substantially as specified.

36. The combination with a can-carrier having a plurality of rotatable can-holders, of a reciprocating receiver having an open lower end, a reciprocating plate therein, a rotating and reciprocating chuck-disk, and a movable seaming-tool holder having seaming tools or rollers thereon, substantially as specified.

37. The combination with a can-carrier having a plurality of rotatable can-holders, of a reciprocating receiver having an open lower end, a reciprocating plate therein, a rotating and reciprocating chuck-disk, a movable seaming-tool holder having seaming tools or rollers thereon, and means for automatically discharging the cans from the can-holders, substantially as specified.

38. The combination with an endless flexible can-carrier having a series of rotatable can-holders thereon, a track for the carrier, a series of rotating and reciprocating chuck-disks, and a series of seaming-tool holders, substantially as specified.

39. The combination with an endless chain carrier having a series of rotatable can-holders thereon, provided with can-ejectors, a series of rotating chuck-disks, seaming-tools, and a track for a chain carrier furnished with an incline or raised portion for operating the ejectors, substantially as specified.

40. The combination with an endless flexible carrier having rotatable can-holders therein, of a series of rotary chuck-disks coöperating with the rotatable can-holders, a series of seaming-tool holders, each furnished with a set of double-seaming tools, substantially as specified.

41. The combination with a receiver of a can-carrier having rotatable can-holders therein, and provided with an ejector having a stem projecting through the carrier, and an elastic block surrounding the ejector-stem and operating to close the opening through which said stem passes while the holder is coöperating with the receiver, substantially as specified.

42. The combination with a receiver of a can-carrier having rotatable can-holders therein, and provided with an ejector having a stem projecting through the carrier, an elastic block surrounding the ejector-stem and operating to close the opening through which said stem passes while the holder is coöperating with the receiver, and a cam or incline for compressing said block, substantially as specified.

43. The combination with a receiver, of a horizontally-moving can-carrier, and a double-seaming mechanism, substantially as specified.

44. The combination with a receiver, of a can-carrier, and a seaming-tool holder furnished with a set of double-seaming tools, substantially as specified.

45. The combination with a can-carrier having a plurality of can-holders, of a plurality of receivers, and a plurality of double-seaming mechanisms, substantially as specified.

46. The combination with a can-carrier having a plurality of can-holders, of a plurality of receivers, a plurality of double-seaming mechanisms and a plurality of devices for sealing the cans, substantially as specified.

47. The combination with a can-carrier having a plurality of can-holders, of a plurality of receivers, a plurality of double-seaming mechanisms, a plurality of devices for sealing the cans, and means for automatically discharging the cans from the can-holders, substantially as specified.

48. The combination with a can-carrier having a series of rotatable can-holders, of a series of reciprocating open-ended receivers, a series of rotating and reciprocating chuck-disks, and a series of sets of double-seaming tools, substantially as specified.

49. The combination with a can-carrier having a series of rotatable can-holders, of a series of reciprocating open-ended receivers, a series of rotating and reciprocating chuck-disks, a series of sets of double-seaming tools, each of said receivers having a reciprocating plate or disk therein, substantially as specified.

50. The combination with a can-carrier having a series of rotatable can-holders, of a series of reciprocating open-ended receivers, a series of rotating and reciprocating chuck-disks, a series of sets of double-seaming tools, each of said receivers having a reciprocating plate or disk therein, and means for automatically controlling the admission of air to the receiver, substantially as specified.

51. The combination with a series of open-ended reciprocating receivers, of a can-carrier having a series of rotatable can-holders, a series of rotating and reciprocating chuck-disks, a series of rotary tool-holders each furnished with a plurality of sets of double-seaming rollers, substantially as specified.

EDWIN NORTON.
JOHN G. HODGSON.

Witnesses to the signature of Edwin Norton:
G. A. PAYNE,
E. L. WARE.

Witnesses to the signature of John G. Hodgson:
H. M. MUNDAY,
EDMUND ADCOCK.